(12) United States Patent
Binder et al.

(10) Patent No.: US 11,572,051 B2
(45) Date of Patent: Feb. 7, 2023

(54) EVALUATION ELECTRONICS AND METHOD FOR ESTIMATING A MASTER BRAKE CYLINDER PRESSURE IN A VEHICLE BRAKE SYSTEM EQUIPPED WITH AN ELECTROMECHANICAL BRAKE BOOSTER

(71) Applicant: Robert Bosch GmbH, Stuttgart (DE)

(72) Inventors: Christian Binder, Mainhardt (DE); Manfred Gerdes, Vaihingen/Enz (DE); Herbert Vollert, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 748 days.

(21) Appl. No.: 16/474,609

(22) PCT Filed: Nov. 30, 2017

(86) PCT No.: PCT/EP2017/080980
§ 371 (c)(1),
(2) Date: Jun. 28, 2019

(87) PCT Pub. No.: WO2018/121953
PCT Pub. Date: Jul. 5, 2018

(65) Prior Publication Data
US 2021/0129821 A1 May 6, 2021

(30) Foreign Application Priority Data
Dec. 29, 2016 (DE) .......................... 102016226324.2

(51) Int. Cl.
*B60T 17/22* (2006.01)
*B60T 8/172* (2006.01)
(Continued)

(52) U.S. Cl.
CPC ............ *B60T 17/221* (2013.01); *B60T 8/172* (2013.01); *B60T 13/745* (2013.01); *H02P 15/00* (2013.01); *B60T 2270/88* (2013.01)

(58) Field of Classification Search
CPC ...... B60T 17/221; B60T 8/172; B60T 13/745; B60T 2270/88; B60T 8/17; B60T 13/74; H02P 15/00; B60Y 2400/81; Y02T 10/62
See application file for complete search history.

(56) References Cited

U.S. PATENT DOCUMENTS

| 2013/0197771 A1* | 8/2013 | Takeda .................. B60T 13/745 701/70 |
| 2013/0325253 A1 | 12/2013 | Watanabe et al. |
| 2015/0032352 A1 | 1/2015 | Butz et al. |

FOREIGN PATENT DOCUMENTS

| CN | 101407211 A | * | 4/2009 | ................ B60T 7/12 |
| CN | 101909954 A | * | 12/2010 | .......... B60T 8/17616 |

(Continued)

OTHER PUBLICATIONS

Machine Translation of Ajiro's reference (JP 2013-86619 A) (Year: 2013).*

(Continued)

*Primary Examiner* — Peter D Nolan
*Assistant Examiner* — Tarek Elarabi
(74) *Attorney, Agent, or Firm* — Norton Rose Fulbright US LLP; Gerard Messina (57) ABSTRACT

In an electronic evaluation system for a vehicle braking system equipped with an electromechanical brake booster, a method for estimating a brake master cylinder pressure includes: estimating a first initial value of the pressure based on a first current intensity of a current of a motor of the booster at the first time and on a first rotation angle of a rotor of the motor at the first time; specifying a correction value as a difference between the first initial value and a measured (Continued)

value of the pressure; estimating a second initial value of the pressure based on a second current intensity of the current at the second time and on a second rotation angle of the rotor at the second time; and specifying, based on the second initial value and the correction value, an estimated value of the pressure at the second time.

13 Claims, 2 Drawing Sheets

(51) Int. Cl.
    *B60T 13/74*     (2006.01)
    *H02P 15/00*     (2006.01)

(56) References Cited

FOREIGN PATENT DOCUMENTS

| | | | |
|---|---|---|---|
| CN | 103260980 | A | 8/2013 |
| DE | 102007016136 | A1 | 10/2008 |
| DE | 202010017605 | U1 | 10/2012 |
| DE | 112012001026 | T5 | 12/2013 |
| EP | 994797 | B1 | 5/2002 |
| JP | 2002220043 | A * | 8/2002 |
| JP | 2010018193 | A | 1/2010 |
| JP | 2010173451 | A | 8/2010 |
| JP | 2013-86619 | A * | 5/2013 |
| JP | 2013086638 | A | 5/2013 |
| JP | 5974447 | B2 * | 8/2016 |
| JP | 2017077735 | A * | 4/2017 ............ B60T 8/1755 |
| WO | 2004110840 | A1 | 12/2004 |
| WO | 2014048705 | A1 | 4/2014 |

OTHER PUBLICATIONS

International Search Report dated Mar. 12, 2018 of the corresponding International Application PCT/EP2017/080980 filed Nov. 30, 2017.

\* cited by examiner

EVALUATION ELECTRONICS AND METHOD FOR ESTIMATING A MASTER BRAKE CYLINDER PRESSURE IN A VEHICLE BRAKE SYSTEM EQUIPPED WITH AN ELECTROMECHANICAL BRAKE BOOSTER

CROSS-REFERENCE TO RELATED APPLICATIONS

The present application is the national stage of International Pat. App. No. PCT/EP2017/080980 filed Nov. 30, 2017, and claims priority under 35 U.S.C. § 119 to DE 10 2016 226 324.2, filed in the Federal Republic of Germany on Dec. 29, 2016, the content of each of which are incorporated herein by reference in their entireties.

FIELD OF THE INVENTION

The present invention relates to an electronic evaluation system for a braking system of a vehicle that is equipped with an electromechanical brake booster, and to a control apparatus for an electromechanical brake booster of a braking system of a vehicle. The invention also relates to a braking system for a vehicle. The invention furthermore relates to a method for estimating a brake master cylinder pressure in a braking system of a vehicle equipped with an electromechanical brake booster, and to a method for operating an electromechanical brake booster of a braking system of a vehicle.

BACKGROUND

Electromechanical brake boosters, such as an electromechanical brake booster disclosed in DE 20 2010 017 605 U1, which are respectively locatable or located upstream from a brake master cylinder of a braking system of a vehicle, are known from the existing art. The intention is for at least one displaceable piston of the brake master cylinder to be displaceable into the brake master cylinder, by operation of a motor of the respective electromechanical brake booster, in such a way that a brake master cylinder pressure in the brake master cylinder becomes increased.

SUMMARY

An example embodiment of the present invention is directed to an electronic evaluation system for a braking system of a vehicle, the braking system being equipped with an electromechanical brake booster. An example embodiment of the present invention is directed to a control apparatus for an electromechanical brake booster of a braking system of a vehicle. An example embodiment of the present invention is directed to a braking system for a vehicle. An example embodiment of the present invention is directed to a method for estimating a brake master cylinder pressure in a braking system of vehicle, the system being equipped with an electromechanical brake booster. An example embodiment of the present invention is directed to a method for operating an electromechanical brake booster of a braking system of a vehicle.

The present invention creates capabilities for quickly and reliably estimating brake master cylinder pressure. In particular, the respective estimate can be executed more quickly than a data transfer via a data bus, for example a CAN bus, of a measured value for the brake master cylinder pressure measured by way of at least one pressure sensor. It is thereby possible, using the present invention, also to react more quickly to a risk of occurrence of a comparatively high pressure or pressure peaks in the respective braking system.

By use of the correction value when estimating the brake master cylinder pressure in accordance with the present invention, the at least one estimated value for the brake master cylinder pressure obtained thereby can be specified even without taking into account the effects of machine tolerances. As is explained in more detail below, the at least one estimated value obtained by way of the present invention is a relatively reliable value for the brake master cylinder pressure.

In an example embodiment, the electronic evaluation system is designed to specify the correction value as a difference between the initial value of the brake master cylinder pressure estimated for a first time, and the measured value of the brake master cylinder pressure measured at the first time. This type of physical design of the electronic evaluation system can be implemented easily and inexpensively, as is explained below.

In an example embodiment, the electronic evaluation system is designed to re-specify the correction value, after a time interval that is predefined or is specified by the electronic evaluation system, as a difference between an initial value of the brake master cylinder pressure estimated for the respective time and a measured value of the brake master cylinder pressure measured at the same time. The correction value can thus be continuously optimized in terms of a friction of a gearing system of the electromechanical brake booster (which can vary greatly depending on load), and in terms of environmental conditions. This improves a quality of the specification, executed by way of the electronic evaluation system, of the at least one estimated value of the brake master cylinder pressure.

In addition, the electronic evaluation system can be designed to specify the time interval to be shorter during an antilock regulation operation executed in the brake system. Comparatively high pressures or pressure peaks can occur in the brake master cylinder especially during an antilock regulation operation (ABS or ESP regulation operation) because of the operation of at least one pump or return pump of the braking system. By rapidly specifying the correction value after a comparatively short time interval, however, it is possible to ensure that a reliable estimated value of the brake master cylinder pressure in the brake master cylinder is always available during the antilock regulation operation. It is thereby possible to react quickly to a possibly existing risk of an undesirably high pressure in the brake master cylinder. The embodiment described here for the electronic evaluation system thus contributes to reducing a risk of damage to braking system components during antilock regulation operation.

The advantages described above are also provided by a control apparatus for an electromechanical brake booster of a braking system of a vehicle having an electronic evaluation system of this kind, an estimated value for the brake master cylinder pressure in the brake master cylinder of the braking system being continuously specifiable by way of the electronic evaluation system, and the motor of the electromechanical brake booster being controllable by way of the control apparatus in consideration at least of a most recently specified estimated value for the brake master cylinder pressure. In particular during an antilock regulation operation (ABS or ESP regulation operation), upon recognition that a risk of an undesirably high pressure in the brake master cylinder exists, it is possible to react quickly by limiting operation of the motor of the electromechanical brake booster. The conventional disadvantage of the electromechanical brake booster—that as a rule it does not react elastically, and exhibits a large holding capability because of its high gearing ratio and high gearing friction—can thus be eliminated. Damage to the braking system is thus not a concern even after repeated execution of antilock regulation operations. Equipping the braking system with the control apparatus described here thus easily pays for itself in terms of repair cost savings.

The advantages described above are also produced in a braking system for a vehicle having an electronic evaluation system of this kind or having a corresponding control apparatus, having the brake master cylinder, and having the electromechanical brake booster.

Execution of a corresponding method for estimating a brake master cylinder pressure in a braking system, equipped with an electromechanical brake booster, of a vehicle also creates the advantages already described above. Additionally, the method can be refined in accordance with the embodiments of the electronic evaluation system which are explained above.

In an example embodiment of the method, at least the following steps are executed in order to estimate the first initial value of the brake master cylinder pressure at the first time: specifying a motor moment of the motor of the electromechanical brake booster at the first time, in consideration at least of the first current intensity of the motor current of the motor of the electromechanical brake booster at the first time; specifying an angular acceleration of the motor of the electromechanical brake booster at the first time, in consideration at least of the first rotation angle of the rotor of the motor of the electromechanical brake booster at the first time; specifying a product of the angular acceleration of the motor of the electromechanical brake booster at the first time multiplied by an inertia of the motor of the electromechanical brake booster; and specifying, in consideration at least of a difference between the motor moment of the motor of electromechanical brake booster at the first time and the product of the angular acceleration of the motor of the electromechanical brake booster at the first time multiplied by the inertia of the motor of the electromechanical brake booster, an assisting force exerted at the first time by way of the electromechanical brake booster, the assisting force exerted by way of the electromechanical brake booster at the first time also being taken into consideration when estimating the first initial value of the brake master cylinder pressure at the first time.

Preferably the following steps are additionally executed in order to estimate the first initial value of the brake master cylinder pressure at the first time: specifying a time derivative or a gradient of the assisting force exerted by way of the electromechanical brake booster at the first time; specifying a translation of a piston of the electromechanical brake booster at the first time, in consideration at least of the first rotation angle of the rotor of the motor of the electromechanical brake booster at the first time; and specifying a quotient of the time derivative or gradient of the assisting force exerted by way of the electromechanical brake booster at the first time divided by the translation of the piston of the electromechanical brake booster at the first time, the quotient specified for the first time also being taken into consideration when estimating the first initial value of the brake master cylinder pressure at the first time.

The above-described embodiments of the electronic evaluation system can also be designed to execute at least some of the method steps described above.

In addition, execution of a corresponding method for operating an electromechanical brake booster of a braking system of a vehicle also brings about the advantages already explained above. The method for operating an electromechanical brake booster of a braking system of a vehicle can also be refined in accordance with the embodiments, explained above, of the electronic evaluation system and/or of the control apparatus.

Further features and advantages of the present invention are explained below with reference to the figures.

DETAILED DESCRIPTION

An implementability of the method described hereinafter is not limited either to a specific braking system type of the braking system equipped with the electromechanical brake booster or to a specific vehicle type or motor vehicle type of the vehicle or motor vehicle fitted with the braking system. The "electromechanical brake booster" is a brake booster equipped with an (electric) motor. The electromechanical brake booster is furthermore located upstream from a brake master cylinder of the braking system in such a way that as a result of operation of the motor of the electromechanical brake booster, at least one displaceable piston of the brake master cylinder is displaceable or becomes displaced into the brake master cylinder.

Figure 1A:
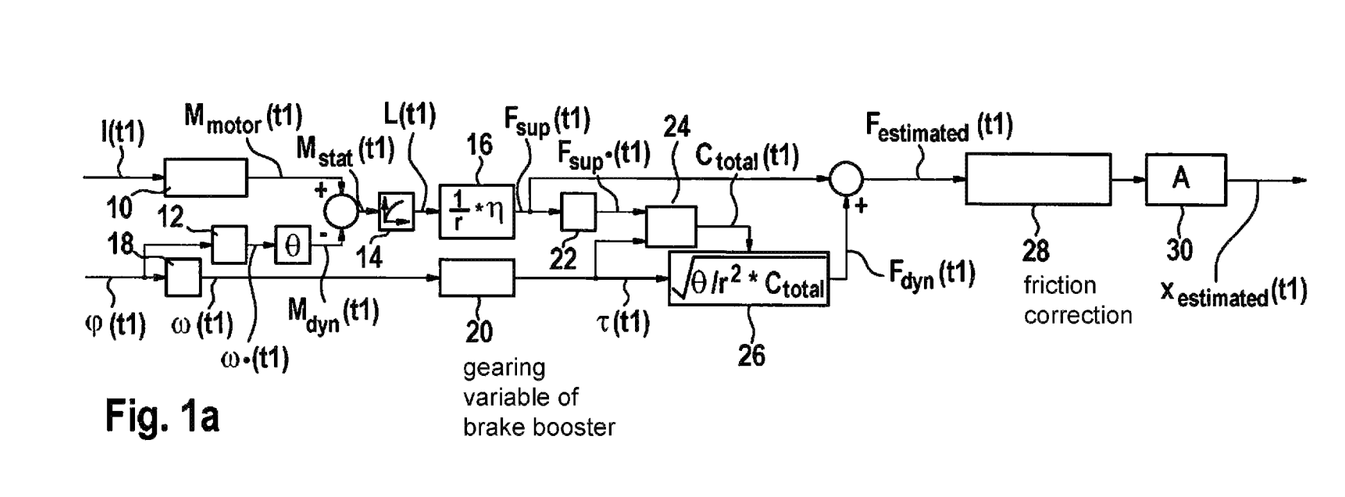
FIGS. 1a-1c are flowcharts that illustrate a method for estimating a brake master cylinder pressure in a braking system of a vehicle, where the braking system is equipped with an electromechanical brake booster, according to an example embodiment of the present invention.

In a method step schematically illustrated in FIG. 1a, a first initial value $x_{estimated}(t1)$ of the brake master cylinder pressure in the brake master cylinder of the braking system at a first time t1 is estimated. Estimation of the first initial value $x_{estimated}(t1)$ of the brake master cylinder pressure at the first time t1 is accomplished in consideration at least of a first current intensity $I(t1)$ of a motor current of the motor of the electromechanical brake booster at the first time t1, and of a first rotation angle $\phi(t1)$ of a rotor of the motor of the electromechanical brake booster at the first time t1. Values that are easy to estimate or to measure can thus be used in order to estimate the first initial value $x_{estimated}(t1)$ of the brake master cylinder pressure at the first time t1. (The first rotation angle $\phi(t1)$ of the rotor of the motor at the first time t1 can be ascertained or estimated, for example, by way of a rotor position signal.)

FIG. 1a shows a possibility for estimating the first initial value $x_{estimated}(t1)$ of the brake master cylinder pressure at the first time t1. For this, in consideration of motor-specific data stored in a block 10, a motor moment $M_{motor}(t1)$ of the motor of the electromechanical brake booster at the first time t1 is derived from the first current intensity $I(t1)$ of the motor of the electromechanical brake booster at the first time t1. The motor moment $M_{motor}(t1)$ of the motor of the electromechanical brake booster at the first time t1 produces, as a dynamic component $M_{dyn}(t1)$, a "motor dynamics" at the first time t1 and, as a static component $M_{stat}(t1)$, an "overriding" of a load moment or counter-moment $L(t1)$ that acts against the motor of the electromechanical brake booster at the first time t1. The dynamic component $M_{dyn}(t1)$ at the first time t1 can be calculated as the product of an angular acceleration $\omega \cdot (t1)$ of the motor of the electromechanical brake booster at the first time t1 and an inertia $\theta$ of the motor of the electromechanical brake booster. The angular acceleration $\omega \cdot (t1)$ of the motor at the first time t1 is obtained from a second differentiation over time, executed in a block 12, of the first rotation angle $\phi(t1)$ of the rotor of the motor at the first time t1. The static component $M_{stat}(t1)$ at the first time t1 is thus obtained from a difference between the motor moment $M_{motor}(t1)$ of the motor of the electromechanical brake booster at the first time t1 and the dynamic component $M_{dyn}(t1)$ at the first time t1.

The static component $M_{stat}(t1)$ at the first time t1 can then be converted, using a characteristic curve stored in a block 14, into the load moment $L(t1)$ that acts against the motor of the electromechanical brake booster at the first time t1. A gearing variable r of a gearing system of the electromechanical brake booster, and an efficiency $\eta$ of the electromechanical brake booster, are stored in a block 16. Using these variables, an assisting force $F_{sup}(t1)$ exerted by way of the electromechanical brake booster at the first time t1 can be derived from the load moment $L(t1)$ present at the first time t1.

A differentiation over time executed in a block 18 produces, from the first rotation angle $\phi(t1)$ of the rotor of the motor at the first time t1, an angular speed $\omega(t1)$ of the motor of the electromechanical brake booster at the first time t1. The gearing variable r of the gearing system of the electromechanical brake booster is stored in a block 20, and by way of that variable the angular speed $\omega(t1)$ of the motor at the first time t1 is converted into a translation or translation speed $\tau(t1)$ of a piston of the electromechanical brake booster (for example, of a booster body or valve body), located downstream from the gearing system, at the first time t1. In addition, a time derivative or gradient $F_{sup} \cdot (t1)$ of the assisting force $F_{sup}(t1)$ exerted by way of the electromechanical brake booster at the first time t1 is ascertained in a block 22. A quotient of the time derivative or gradient $F_{sup}(t1)$ at the first time t1, divided by the translation $\tau(t1)$ at the first time t1, is calculated in a further block 24 and indicates a change in load $C_{total}(t1)$ at the first time t1. The change in load $C_{total}(t1)$ at the first time t1 can also be referred to as a "stiffness" present at the first time t1. The change in load $C_{total}(t1)$ at the first time t1 is outputted to a block 26 in which the inertia $\theta$ of the motor of the electromechanical brake booster and the gearing variable r of the gearing system of the electromechanical brake booster are stored. It is thereby possible to calculate, from the change in load $C_{total}(t1)$ at the first time t1, a dynamic force $F_{dyn}(t1)$ exerted by way of the electromechanical brake booster at the first time t1.

From a sum of the assisting force $F_{sup}(t1)$ exerted by way of the electromechanical brake booster at the first time t1 plus the dynamic force $F_{dyn}(t1)$ exerted by way of the electromechanical brake booster at the first time t1, it is possible to calculate an estimated value $F_{estimated}(t1)$ for a "brake application force" or "pressure increase force" of the electromechanical brake booster at the first time t1, with which the electromechanical brake booster applies braking into the brake master cylinder at the first time t1 and brings about or increases the brake master cylinder pressure present therein. Optionally, a friction correction can also be executed, in a block 28, for the estimated value $F_{estimated}(t1)$ for the "brake application force" or "pressure increase force" at the first time t1. The estimated value $F_{estimated}(t1)$ for the "brake application force" or "pressure increase force" at the first time t1 is then converted, using a brake application area A (stored in a block 30) of the at least one displaceable piston of the brake master cylinder, into the estimated first initial value $x_{estimated}(t1)$ of the brake master cylinder pressure at the first time t1.

The sub-steps described in the preceding paragraphs offer a particularly advantageous and quickly executable capability for reliably estimating the first initial value $x_{estimated}(t1)$ of the brake master cylinder pressure at the first time t1. The sub-steps depicted in FIG. 1a can be executed more quickly than a data transfer or signal transfer, via a data bus, of a measured value $x_{measured}(t1)$ of the brake master cylinder pressure which is measured by way of at least one pressure sensor at the first time t1. An implementability of the method described here is not, however, limited to an execution of the sub-steps depicted in FIG. 1a.

Figure 1B:
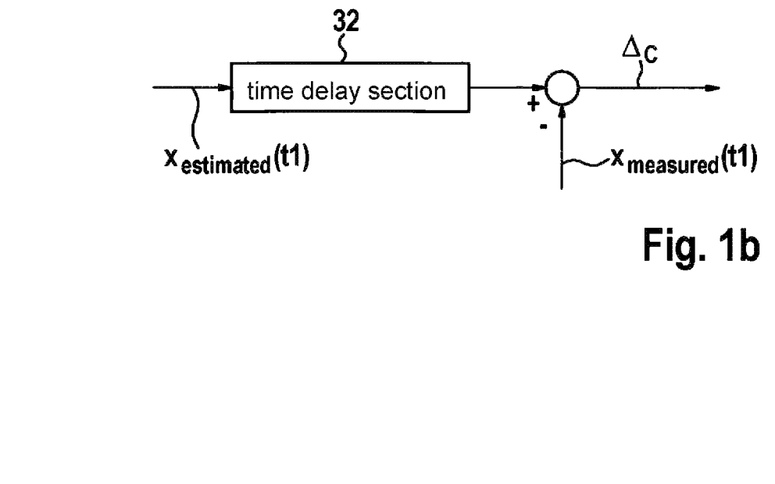

A further method step of the method described here is reproduced by way of FIG. 1b. In this method step, a correction value $\Delta c$ for estimating the brake master cylinder pressure is specified. For that, the correction value $\Delta c$ is specified as a difference between the first initial value $x_{estimated}(t1)$ of the brake master cylinder pressure at the first time t1, and a measured value $x_{measured}(t1)$ of the brake master cylinder pressure. The measured value $x_{measured}(t1)$ of the brake master cylinder pressure used for execution of this method step is preferably measured by way of the at least one pressure sensor at the first time t1. A time delay section 32 can be used in order to ensure a desired synchronicity of the first initial value $x_{estimated}(t1)$ of the brake master cylinder pressure at the first time t1 with the measured value $x_{measured}(t1)$ of the brake master cylinder pressure for specifying the correction value $\Delta c$. In this case, time delay section 32 produces a delay in provision of the initial value $x_{estimated}(t1)$ of the brake master cylinder pressure estimated for the first time t1 until the measured value $x_{measured}(t1)$ of the brake master cylinder pressure measured at the first time t1 has been conveyed via the data bus. The method step outlined in FIG. 1b thus takes into account the fact that estimating the first initial value $x_{estimated}(t1)$ of the brake master cylinder pressure at the first time t1 (in accordance with the method step of FIG. 1a) requires less time than conveying, via the data bus, the measured value $x_{measured}(t1)$ measured by way of the at least one pressure sensor at the first time t1. A transfer time that is required for conveying, via the data bus, the measured value $x_{measured}(t1)$ measured by way of the at least one pressure sensor at the first time t1 can be estimated relatively accurately, thereby simplifying the design of time delay section 32.

In a step of the method described here which is not illustrated, a second initial value $x_{estimated}(t1+\Delta t)$ of the brake master cylinder pressure in the brake master cylinder at a second time $t1+\Delta t$ (after the first time t1) is estimated. This can be accomplished in accordance with the method step schematically reproduced by FIG. 1a. The second initial value $x_{estimated}(t1+\Delta t)$ of the brake master cylinder pressure at the second time $t1+\Delta t$ is therefore also estimated in consideration at least of a second current intensity $I(t1+\Delta t)$ of the motor current of the motor of the electromechanical brake booster at the second time $(t1+\Delta t)$, and of a second rotation angle $\phi(t1+\Delta t)$ of the rotor of the electromechanical brake booster at the second time $t1+\Delta t$.

Figure 1C:
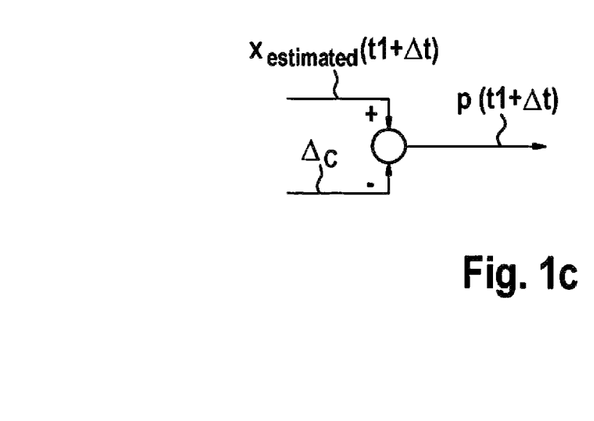

In a further method step that is schematically reproduced in FIG. 1c, an estimated value $p(t1+\Delta t)$ of the brake master cylinder pressure in the brake master cylinder at the second time t1+Δt is specified in consideration of the second initial value $x_{estimated}$(t1+Δt) of the brake master cylinder pressure at the second time t1+Δt, and of the correction value Δc. As depicted schematically in FIG. 1c, the estimated value p(t1+Δt) of the brake master cylinder pressure at the second time t1+Δt can be specified as a difference between the second initial value $x_{estimated}$(t1+Δt) and the correction value Δc.

The method step schematically depicted in FIG. 1c can be executed relatively quickly. Once the correction value Δc has been specified, the method steps depicted in FIGS. 1a and 1c can be executed for each time (starting at the first time t1) more quickly than the measured value, measured by way of the at least one pressure sensor at the respective time, can be conveyed via the data bus. (Continuous) execution of the method steps of FIGS. 1a and 1c thus allows an estimated value for the brake master cylinder pressure at the present time always to be available. This estimate of the brake master cylinder pressure at the present time has a very short latency time and can be executed highly dynamically. Using the correction value Δc when estimating the brake master cylinder pressure at the present time ensures not only a comparatively fast estimate, but also an estimate for the brake master cylinder pressure at the present time from which machine tolerances have been removed. Using the correction value Δc furthermore ensures that tolerances in the signals for the first or a present current intensity I(t1) of the motor of the electromechanical brake booster at the first time t1 or at a present time, and for the first or a present rotation angle φ(t1) of the rotor of the motor of the electromechanical brake booster at the first time t1 or at the present time, have little or no effect on a reliability of the estimate of the brake master cylinder pressure at the present time. (Tolerances of the measured value $x_{measured}$(t1) and of the equalization method as a rule are negligible.)

The method described here therefore produces an estimate of the brake master cylinder pressure in the brake master cylinder with good reliability, high quality, and advantageous dynamics. The possibility that uncertainties in the estimate of the brake master cylinder pressure at the present time might result in underbraking or in an overload in the respective braking system (during an application of control to the braking system in consideration of the present estimated value of the brake master cylinder pressure) is thus excluded. With the method described here for estimating a brake master cylinder pressure, the transfer time that is required for conveying, via the data bus, the measured value $x_{measured}$(t1) measured by way of the at least one pressure sensor at the first time t1 has almost no influence on the reliability, quality, or dynamics of the estimate of the brake master cylinder pressure at the present time. An inexpensive data bus, for example a CAN bus, can thus be used for data transfer or signal transfer of the measured value $x_{measured}$(t1) from the at least one pressure sensor to the electronic system utilized to execute the method described here.

In an example embodiment of the method represented in FIGS. 1a-1c, the correction value Δc is re-specified (in accordance with the method step shown in FIG. 1b) using a predefined or defined time interval. In both instances, the correction value Δc is re-specified as a difference between an initial value of the brake master cylinder pressure estimated for a respective time, and a measured value of the brake master cylinder pressure measured at the same time. The correction value Δc can thus be continuously updated.

In particular, the time interval according to which the correction value Δc is re-specified can be specified to be shorter during an antilock regulation operation executed in the braking system, for example an ABS or ESP regulation operation, (while the time interval in the unregulated state of the braking system is specified to be longer). The result is that the correction value Δc can be updated more quickly in particular during an antilock regulation operation.

Figure 2:
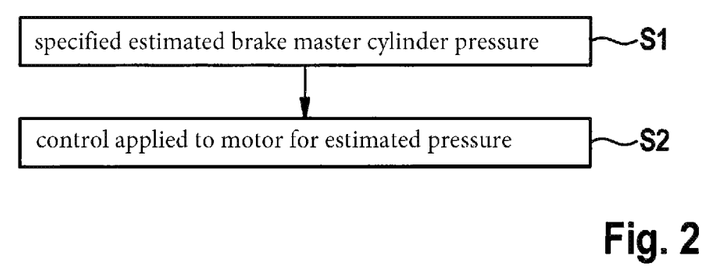
FIG. 2 is a flowchart that illustrates a method for operating an electromechanical brake booster of a braking system of a vehicle according to an example embodiment of the present invention.

FIG. 2 is a flowchart to explain an embodiment of the method for operating an electromechanical brake booster of a braking system of a vehicle. An implementability of the method described below is again not limited either to a specific braking system type of the braking system equipped with the electromechanical brake booster or to a specific vehicle type or motor vehicle type of the vehicle or motor vehicle fitted with the braking system. In the context of the explanation of the method of FIG. 2 as well, the term "electromechanical brake booster" is a brake booster equipped with an (electric) motor. The electromechanical brake booster is furthermore located upstream from a brake master cylinder of the braking system in such a way that, by operation of the motor of the electromechanical brake booster, at least one displaceable piston of the brake master cylinder is displaceable, or becomes displaced, into the brake master cylinder.

In a method step S1 of the method described here, an estimated value for a brake master cylinder pressure in a brake master cylinder of the braking system is specified, this being accomplished in accordance with the method explained above for estimating a brake master cylinder pressure in a braking system, equipped with an electromechanical brake booster, of a vehicle. The method step S1 is executed continuously during the method described here.

In a further method step S2, control is applied to a motor of the electromechanical brake booster in consideration at least of a most recently specified estimated value for the brake master cylinder pressure. In particular, a possibly existing risk of an undesirably high brake master cylinder pressure in the brake master cylinder during an antilock regulation operation can be reacted to promptly by taking into consideration at least one most recently specified estimated value for the brake master cylinder pressure. For example, an output requested from the electromechanical brake booster can be reduced as soon as the most recently specified estimated value for the brake master cylinder pressure lies outside a defined normal-value range.

Figure 3:
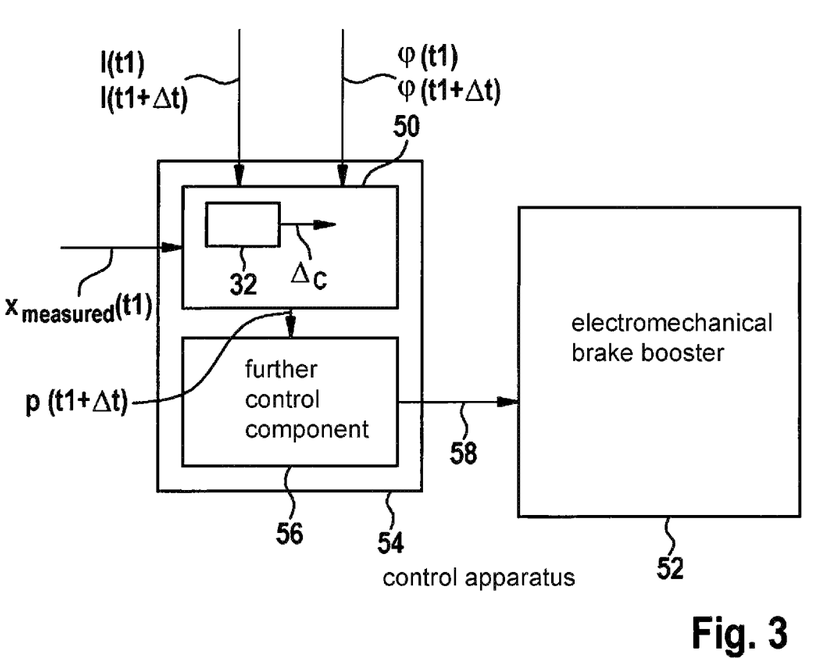
FIG. 3 schematically illustrates an electronic evaluation system according to an example embodiment of the present invention.

FIG. 3 schematically depicts an embodiment of the electronic evaluation system. Electronic evaluation system 50 schematically depicted in FIG. 3 can interact with a braking system, equipped with an electromechanical brake booster 52, of a vehicle. A usability of electronic evaluation system 50 is not limited either to a particular braking system type of the braking system equipped with electromechanical brake booster 52 or to a specific vehicle type or motor vehicle type of the vehicle or motor vehicle fitted with the braking system. Reference is made to the descriptions above regarding the configuration of electromechanical brake booster 52.

Electronic evaluation system 50 is designed to estimate, in consideration at least of a current intensity I(t1) and I(t1+Δt) of a motor current of a motor of electromechanical brake booster 52 furnished to electronic evaluation system 50 at a specific time t1 and t1+Δt, and in consideration of a rotation angle φ(t1) and φ(t1+Δt) of a rotor of the motor of electromechanical brake booster 52 furnished to electronic evaluation system 50 at the same time t1 and t1+Δt, a respective initial value $x_{estimated}$(t1) and $x_{estimated}$(t1+Δt) of a brake master cylinder pressure in a brake master cylinder of the braking system for the specific time. The electronic evaluation system can be designed for that purpose, for example, to execute the method steps described above.

Electronic evaluation system 50 is additionally designed to specify a correction value Δc constituting a difference between a first initial value $x_{estimated}(t1)$ of the brake master cylinder pressure estimated for a first time t1, and a measured value $x_{measured}(t1)$ of the brake master cylinder pressure which is furnished to electronic evaluation system 50. The correction value Δc is preferably specifiable by way of electronic evaluation system 50 as a difference between the initial value $x_{estimated}(t1)$ of the brake master cylinder pressure estimated for the first time t1, and the measured value $x_{measured}(t1)$ of the brake master cylinder pressure measured at the first time t1. Electronic evaluation system 50 can be configured for that purpose, for example, with a time delay section 32.

An estimated value p(t1+Δt) of the brake master cylinder pressure in the brake master cylinder at the second time t1+Δt can then be specified and outputted by way of electronic evaluation system 50 in consideration of a second initial value $x_{estimated}(t1+\Delta t)$ of the brake master cylinder pressure estimated for a second time t1+Δt after the first time t1, and of the correction value Δc. All the above-described method steps can be executable by way of electronic evaluation system 50.

Electronic evaluation system 50 as well therefore supplies, comparatively quickly, low-tolerance estimated values of the brake master cylinder pressure. High dynamics in the estimate of the brake master cylinder pressure by way of electronic evaluation system 50 are ensured. Few or no estimation errors occur even in the case of rapidly changing rotation speeds of the motor of electromechanical brake booster 52, or large temperature fluctuations in the braking system. Although a gearing system having a high gearing ratio and high friction is, as a rule, arranged downstream from electromechanical brake booster 52, the effects of friction, which is highly dependent on load and on environmental conditions, can be "filtered out" by electronic evaluation system 50 thanks to the use of correction value Δc. Production tolerances have little or no influence on the quality of the estimate.

Electronic evaluation system 50 is preferably designed to re-specify correction value Δc, constituting a difference between an initial value of the brake master cylinder pressure estimated for a respective time and a measured value of the brake master cylinder pressure measured at the same time, after a predefined time interval or one defined by electronic evaluation system 50. In addition, electronic evaluation system 50 can be designed to specify the time interval to be shorter during an antilock regulation operation executed in the braking system.

In the example of FIG. 3, electronic evaluation system 50 is part of a control apparatus 54 for electromechanical brake booster 52, an estimated value for the brake master cylinder pressure in the brake master cylinder of the braking system being continuously specifiable by way of electronic evaluation system 50. Advantageously, control apparatus 54 (or a further control component 56 of control apparatus 54) is designed to apply control to the motor of electromechanical brake booster 52 (by way of at least one control signal 58) in consideration at least of a most recently specified estimated value for the brake master cylinder pressure. Control apparatus 54 can thus advantageously use the pressure information continuously furnished by electronic evaluation system 50.

The advantages of electronic evaluation system 50 or of control apparatus 54 are also ensured in the context of the braking system equipped therewith, which additionally also has at least the brake master cylinder and the electromechanical brake booster.

What is claimed is:

1. An electronic evaluation system for a braking system of a vehicle, the braking system including an electromechanical brake booster, the electronic evaluation system comprising a processor, wherein the processor is configured to:
   estimate for each of a plurality of specific times a respective initial value of a brake master cylinder pressure in a brake master cylinder of the braking system based at least on:
      a current intensity of a motor current of a motor of the electromechanical brake booster that is provided to the electronic evaluation system at the respective specific time; and
      a rotation angle of a rotor of the motor of the electromechanical brake booster that is provided to the electronic evaluation system at the respective specific time;
   determine a correction value as a difference between a first of the initial values estimated for a first of the specific times and a measured value of the brake master cylinder pressure provided to the electronic evaluation system;
   determine, based on (a) a second of the initial values estimated for a second one of the specific times, which is after the first of the specific times, and (b) the correction value, an estimated further value of the brake master cylinder pressure in the brake master cylinder at the second of the specific times; and
   output the estimated further value.

2. The electronic evaluation system of claim 1, wherein the measured value to which the processor is configured to compare the first of the initial values for the determination of the correction value is measured at the first time.

3. The electronic evaluation system of claim 2, wherein the processor is configured to re-determine the correction value after a time interval as a difference between another of the initial values estimated for another of the specific times and another measured value measured at the other time.

4. The electronic evaluation system of claim 3, wherein the processor is configured to specify the time interval to be shorter during an antilock regulation operation executed in the braking system than in a non-antilock regulation operation.

5. A control device for a braking system of a vehicle, the braking system including an electromechanical brake booster, the control device comprising at least one processor, wherein the at least one processor is configured to:
   estimate for each of a plurality of specific times a respective initial value of a brake master cylinder pressure in a brake master cylinder of the braking system based at least on:
      a current intensity of a motor current of a motor of the electromechanical brake booster that is provided to the at least one processor at the respective specific time; and
      a rotation angle of a rotor of the motor of the electromechanical brake booster that is provided to the at least one processor at the respective specific time;
   continuously determine values for an estimated further value of the brake master cylinder pressure in the brake master cylinder, wherein each of the values is determined by:
      determining a respective correction value as a difference between one of the initial values estimated for a respective one of the specific times and a measured value of the brake master cylinder pressure provided to the at least one processor; and determining the respective value based on (a) a respective other of the initial values estimated for a respective other of the specific times, which is after the respective one of the specific times, and (b) the respective correction value; and control the motor of the electromechanical brake booster based on a most recently determined one of the values for the estimated further value.

6. A braking system of a vehicle, the braking system comprising:

an electromechanical brake booster that includes a motor and a rotor of the motor; and a control device that includes at least one processor, wherein the at least one processor is configured to:

estimate for each of a plurality of specific times a respective initial value of a brake master cylinder pressure in a brake master cylinder of the braking system based at least on:

a current intensity of a motor current of the motor that is provided to the at least one processor at the respective specific time; and a rotation angle of the rotor that is provided to the at least one processor at the respective specific time;

continuously determine values for an estimated further value of the brake master cylinder pressure in the brake master cylinder, wherein each of the values is determined by:

determining a respective correction value as a difference between one of the initial values estimated for a respective one of the specific times and a measured value of the brake master cylinder pressure provided to the at least one processor; and determining the respective value based on (a) a respective other of the initial values estimated for a respective other of the specific times, which is after the respective one of the specific times, and (b) the respective correction value; and control the motor based on a most recently determined one of the values for the estimated further value.

7. A method for an electronic evaluation system of a braking system of a vehicle to estimate a brake master cylinder pressure in the braking system, the braking system including an electromechanical brake booster, the method comprising:

estimating, by the evaluation system, for each of a plurality of specific times a respective initial value of a brake master cylinder pressure in a brake master cylinder of the braking system based at least on:

a current intensity of a motor current of a motor of the electromechanical brake booster at the respective specific time; and a rotation angle of a rotor of the motor of the electromechanical brake booster at the respective specific time;

determining, by the evaluation system, a correction value as a difference between a first of the initial values estimated for a first of the specific times and a measured value of the brake master cylinder pressure; and determining, based on (a) a second of the initial values estimated for a second one of the specific times, which is after the first of the specific times, and (b) the correction value, an estimated further value of the brake master cylinder pressure in the brake master cylinder at the second of the specific times.

8. The method of claim 7, wherein the measured value of the brake master cylinder pressure is measured at the first time.

9. The method of claim 8, wherein the correction value is re-determined after a time interval as a difference between another of the initial values estimated for another of the specific times and another measured value measured at the other time.

10. The method of claim 9, further comprising specifying different values for the time interval depending on an active operation, such that the time inter is shorter when the active operation is an antilock regulation operation executed in the braking system than when the active operation is a non-antilock regulation operation.

11. The method of claim 7, wherein the estimate of the first of the initial values is performed by:

determining a motor moment of the motor at the first time based on the current intensity at the first time;

determining an angular acceleration of the motor at the first time based on the rotation angle at the first time;

determining a product of the angular acceleration of the motor at the first time and an inertia of the motor;

determining, based on a difference between the motor moment at the first time and the determined product, an assisting force exerted by way of the electromechanical brake booster at the first time; and determining the estimate of the first of the initial values based on the determined assisting force at the first time.

12. The method of claim 7, wherein the estimate of the first of the initial values is performed by:

determining a motor moment of the motor at the first time based on the current intensity at the first time;

determining an angular acceleration of the motor at the first time based on the rotation angle at the first time;

determining a product of the angular acceleration of the motor at the first time and an inertia of the motor;

determining, based on a difference between the motor moment at the first time and the determined product, an assisting force exerted by way of the electromechanical brake booster at the first time;

determining a time derivative or a gradient of the assisting force exerted by way of the electromechanical brake booster at the first time;

determining a translation of a piston of the electromechanical brake booster at the first time based on the first rotation angle of the rotor at the first time;

determining a quotient of the time derivative or gradient of the assisting force exerted by way of the electromechanical brake booster at the first time divided by the translation of the piston of the electromechanical brake booster at the first time; and determining the estimate of the first of the initial values based on the determined quotient.

13. A method for operating an electromechanical brake booster of a braking system of a vehicle, the method comprising:

estimating for each of a plurality of specific times a respective initial value of a brake master cylinder pressure in a brake master cylinder of the braking system based at least on:

a current intensity of a motor current of a motor of the electromechanical brake booster that is provided to the at least one processor at the respective specific time; and a rotation angle of a rotor of the motor of the electromechanical brake booster that is provided to the at least one processor at the respective specific time;

continuously determining values for an estimated further value of the brake master cylinder pressure in the brake master cylinder, wherein each of the values is determined by:
- determining a respective correction value as a difference between one of the initial values estimated for a respective one of the specific times and a measured value of the brake master cylinder pressure provided to the at least one processor; and
- determining the respective value based on (a) a respective other of the initial values estimated for a respective other of the specific times, which is after the respective one of the specific times, and (b) the respective correction value; and controlling the motor of the electromechanical brake booster based on a most recently determined one of the values for the estimated further value.

\* \* \* \* \*